United States Patent [19]

Carter

[11] Patent Number: 4,856,803
[45] Date of Patent: Aug. 15, 1989

[54] BICYCLE STAND ASSEMBLY AND STORAGE STRUCTURE

[76] Inventor: Frederic D. Carter, P.O. Box 5192, Redwood City, Calif. 94063

[21] Appl. No.: 221,702

[22] Filed: Jul. 20, 1988

[51] Int. Cl.$^4$ ............................................. B62H 1/00
[52] U.S. Cl. ................................ 280/293; 280/288.4; 280/291; 403/345
[58] Field of Search ............... 280/289 R, 289 A, 291, 280/293, 295, 297, 304; 403/345, 378

[56] References Cited

U.S. PATENT DOCUMENTS

| 3,931,991 | 1/1976 | Marchello | 280/295 |
| 4,154,452 | 5/1979 | Newman | 280/293 |
| 4,288,090 | 9/1981 | Müller et al. | 280/293 |
| 4,563,016 | 1/1986 | Holleron, Jr. | 280/293 |

FOREIGN PATENT DOCUMENTS

| 382944 | 1/1922 | Fed. Rep. of Germany | 280/304 |
| 372310 | 3/1907 | France | 280/304 |
| 1246387 | 10/1960 | France | 280/293 |
| 255887 | 4/1927 | Italy | 280/293 |
| 815 | 1/1896 | United Kingdom | 280/295 |
| 626665 | 7/1949 | United Kingdom | 280/289 |

Primary Examiner—Charles A. Marmor
Assistant Examiner—Eric Culbreth
Attorney, Agent, or Firm—Douglas A. Chaikin

[57] ABSTRACT

Disclosed herein is a bicycle stand assembly and storage structure. The bicycle stand assembly inludes an elongated suport member for supporting a bicycle in an upright position and a housing adapted for removable connection to the frame of the bicycle. The housing includes a first housing member and a second housing member. Each housing member had an inside surface for intimate contact with the bicycle frame. Fastening members connect the first and second housing members with the frame between the members. The first member additionally includes cylindrical projections for removably connecting the support member. The storage structure includes a first mounting member having an inside surface for mating connection with the bicycle frame and a second mounting member for connecting the first mounting member to the bicycle frame. The storage structure further includes a clip member adapted which is removably attached to the first mounting member. The clip member is adapted for retaining the elongated support member.

14 Claims, 3 Drawing Sheets

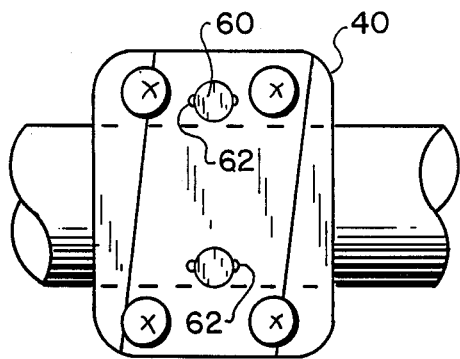
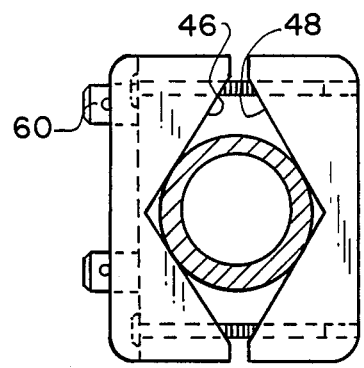
FIG. 6  FIG. 7
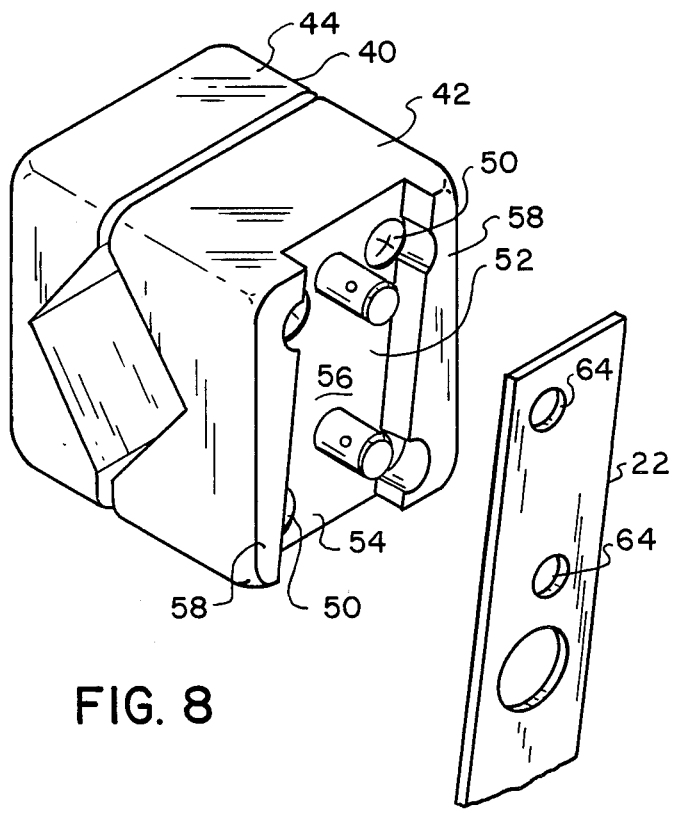
FIG. 8

BICYCLE STAND ASSEMBLY AND STORAGE STRUCTURE

BACKGROUND OF THE INVENTION

1. Field of the Invention

This invention relates to bicycles and more particularly to bicycle stands and structures for storing said stands on a bicycle as the bicycle is moving.

2. Previous Art

Almost since the beginning of the creation of the bicycle, it has been desirable to include a stand for the bicycle which would allow the cyclist to securely support his bicycle in the upright position at rest. In the early days of bicycle technology, a kick stand was used to accomplish this function.

A typical kick stand is made from heavy material such as steel and is mounted to the lower portion of a bicycle frame. The kick stand includes a metal plate fastened to the frame by a set of screws and locking bolts. Typically, the kick stand has a support member which is connected to the face of the plate. The face typically includes two positions for the support member. A first position where the stand supports the bicycle in the upright position and a second position where the support member is folded back and out of the way of the rider during cycling. A spring is used with the kick stand and tends to normally urge the support member into the second position.

The kick stand tends to be heavy and somewhat cumbersome to use. It has a fair number of separate pieces, all of which are subject to failure and all of which add weight to the bicycle. Additionally, when the spring is set at the wrong tension, youngsters or persons without the familiarity of the kick stand operation can injure their foot or ankle. The kick stand must be moved by the foot at a relatively precise location and with a particular force to avoid injury. Additionally, if the spring rusts or otherwise fails, the entire assembly must be removed before operation of the bicycle. Injury may likely result is the cyclist attempts to operate such a rusted or failed kick stand.

An additional disadvantage of the kick stand is that the basic design is incompatible with modern bicycle technology. A serious cyclist may spend hundreds and even thousands of dollars to lighten his bicycle by a pound or even a few ounces. The additional weight of several pounds of the typical kick stand would be contrary to the serious cyclist's primary aim, to lighten his bicycle. Therefore such a kick stand would be totally unsatisfactory despite the added convenience of being able to stand the bicycle upright while at rest.

What is needed is a bicycle support stand which will not add greatly to the weight of the bicycle and which can be removed easily and quickly should the cyclist decide to race or otherwise compete. The bicycle support stand should be easy to use and should be able to be stored easily on the bicycle without getting in the cyclist's way during cycling.

SUMMARY OF THE INVENTION

It is an object of this invention to provide a lightweight bicycle stand assembly for supporting a bicycle in the upright position at rest.

It is a further object of this invention to provide a bicycle stand assembly which includes a storage structure for storing the assembly on the frame of the bicycle.

It is a further object of this invention to provide an inexpensive and easy to use bicycle stand assembly and storage structure.

In accordance with the above objects and those that will be mentioned and will become apparent below, the bicycle stand assembly and storage structure in accordance with this invention, comprises:

elongated support means for supporting a bicycle in an upright position; and a housing adapted for removable connection to the frame of the bicycle, the housing including:

a first housing member and a second housing member, each member having an inside surface for mating contact with the bicycle frame;

means for connecting the first and second members with the frame between the members; and the first member including means for removably connecting the support means.

In a preferred embodiment, the inside surfaces of the first and second housing members is angled to conform, at least in part, to the bicycle frame. The inside surfaces are angled toward one another and in the preferred embodiment make an angle of approximately 120°. This angle allows intimate contact of the housing members with the bicycle frame.

In an additional preferred embodiment, the storage structure includes:

a first mounting member having an inside surface for mating connection with the bicycle frame and a second mounting member defining means for connecting the first mounting member to the bicycle frame; and a clip member adapted for connection to the first mounting member, the clip member further adapted for retaining the elongated support member.

The above described a bicycle stand assembly and storage structure enables the serious cyclist to enjoy the benefits of a stand without having to greatly compromise on weight and aerodynamics. In other words, the benefits that have been achieved by technological advances over the past ten years and more are compatible with the cyclist's desire to be able to support his bicycle upright when employing the bicycle stand assembly and storage structure in accordance with this invention.

It is an advantage of this invention to a provide a bicycle stand which is compatible with modern bicycle technology.

It is an additional advantage of this invention to provide a bicycle stand assembly and storage structure which gives a serious cyclist the benefits of providing a stand only heretofore available on less technologically advanced bicycles.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein:

FIG. 6 is a partial sectional view illustrating the housing attached to the bicycle frame.

FIG. 7 is a partial sectional side view of the housing of FIG. 6.

FIG. 8 is a perspective view of the housing in FIG. 6.

DETAILED DESCRIPTION OF THE INVENTION

Figure 1:
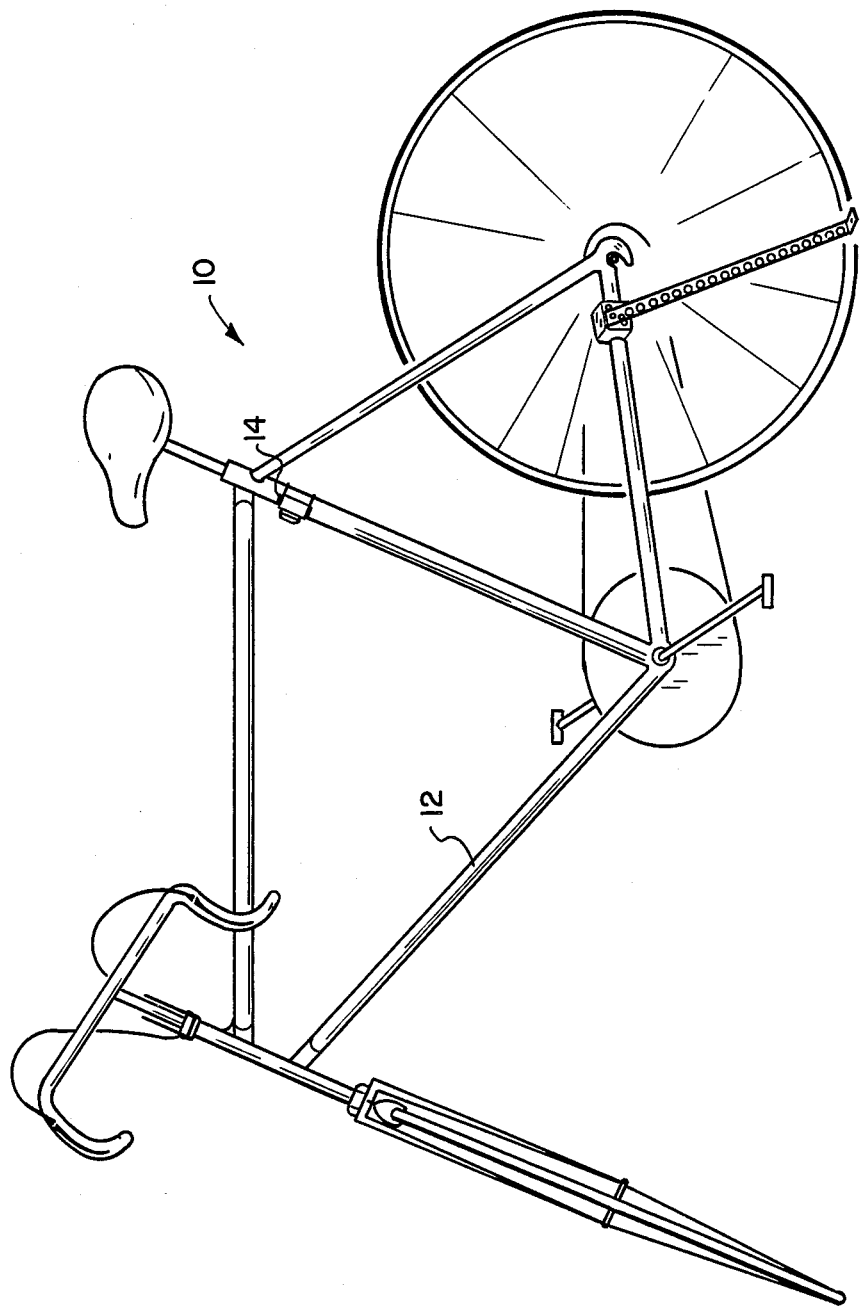
FIG. 1 is an elevated perspective view of the bicycle stand assembly and storage structure in accordance with this invention attached to the frame of a bicycle.

The invention will now be described with respect to FIG. 1 which illustrates the bicycle stand assembly generally indicated by the numeral 10 attached to the bicycle frame 12. The bicycle stand assembly 1 is shown in FIG. 1 supporting the bicycle in the upright position while the bicycle is at rest. Also shown in FIG. 1 is the storage structure 14 attached to the bicycle frame 12. The storage structure 14 is attached to the bicycle frame 12 in such a way as to avoid conflict with the rider as he pedals. The storage structure 14 is mounted on the vertical member of the bicycle frame 12, along the upper portion of the vertical member.

Figure 5:
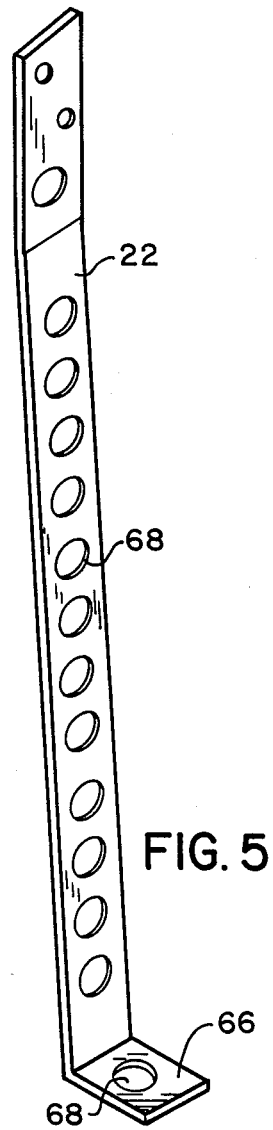
FIG. 5 is a perspective plan view of the support member.
Figure 2:
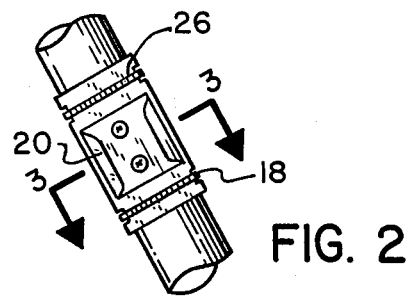
FIG. 2 is a partial sectional view illustrating the first and second mounting members on the bicycle frame.
Figure 3:
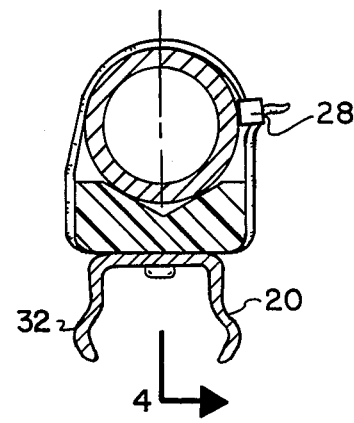
FIG. 3 is a partial sectional view of the mounting members shown in FIG. 2 and taken along line 3—3 looking in the direction of the arrows.
Figure 4:
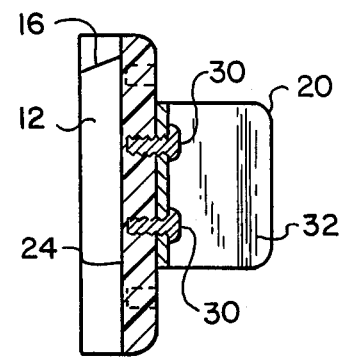
FIG. 4 is a partial sectional view of the mounting members shown in FIG. 3 taken along line 4—4 of FIG. 4 and looking in the direction of the arrow.

With particular reference to FIGS. 2-4, there is shown the storage structure 14 in detail. The storage structure 14 includes a first mounting member 16 and a second mounting member 18. A one-piece clip 20 is fastened to the first mounting member 16. The clip 20 is made from spring steel and is sized and shaped to clasp and retain a support member 22 (FIG. 5) in place.

The first mounting member 16 has an inside surface 24 which is in the shape of a "V". The purpose of the shape of the inside surface 24 is to conform to some extent to the shape of the bicycle frame 12. The "V" shape of the inside surface 24 allows the first mounting member 16 to be in intimate contact with the bicycle frame 12. The angle at the apex of the "V" is between 100° and 140° and preferably 120°. The first mounting member 16 is made of hard plastic and preferably an engineering plastic. The plastic should be such that openings can be made in the first mounting member 16 without cracking the first mounting member 16 as will be appreciated more fully hereinafter.

The second mounting member 18 fastens the first mounting member 16 to the bicycle frame 12. The second mounting member 18 comprises a tie 26 and a lock 28. The tie 26 is inserted through an opening in the lock 28. A one-way latch inside the lock 28 locks the tie 26 in place and prevents the tie 26 from loosening. The tighter the tie 26 is pulled against the first mounting member 16 and the bicycle frame 12 the more of the tie 26 is inserted through the lock 28. A pair of second mounting members 18 are preferably used to secure the first mounting member 16 to the bicycle frame 12 and to retain the first mounting member 16 in intimate contact with the bicycle frame 12. Of course, other means could be used to secure the first mounting member 16 and retain the intimate contact within the spirit and scope of the invention.

As stated above, the clip 20 is fastened to the first mounting member 16. The clip 20 has two (2) openings through which fasteners 30 are inserted. The fasteners 30 are aligned with openings in the first mounting member 16 and screwed in place to secure the clip 20 to the first mounting member 16 as is best shown in FIG. 4. The spring steel of the clip 20 includes arms 32 bent so as to retain the support member 22.

With particular reference to FIGS. 5-8, the bicycle stand assembly 10 will be described in detail. The bicycle stand assembly 10 includes a housing 40 mounted to the bicycle frame 12. The housing 40 includes a first member 42 and a second member 44. The first and second housing members 42 and 44 have inside surfaces 46 and 48, respectively. Each inside surface 46 and 48 is in the shape of a "V".

As discussed earlier with respect to the first mounting member 16, the purpose of the shape of the inside surface is to conform the members 46 and 48 to some extent to the shape of the bicycle frame 12. The "V" shape of the inside surfaces allows the members 46 and 48 to be in intimate contact with the bicycle frame 12. The angle at the apex of the "V" is between 100° and 140° and preferably 120°. Also as discussed earlier with respect to the first mounting member 16, each of the members 46 and 48 is made of hard plastic and preferably an engineering plastic. The plastic should be such that openings can be made in the member 46 and 48 without cracking it.

The members 42 and 44 are placed around the bicycle frame 12 with their inside surfaces 46 and 48, respectively in intimate contact with the bicycle frame 12 and with the inside surfaces 46 and 48 opposing one another. Four fastening screws 50 are inserted through openings in the first member 42 and screwed into threaded openings in the second member 44. The screws are tightened together to promote intimate contact and make sure that the housing 40 does not rattle against the bicycle frame 12.

The outside face 52 of the first member 42 is recessed an amount at least equal to the thickness of the support member 22 which defines a recess 54 and preferably an amount approximately equal to the thickness of the support member 22. As will be appreciated more fully hereinafter, the recessing of the outside face 52 promotes secure support for the bicycle in the upright position and adds to the attractiveness of the invention herein. The recess 54 has a main face 56 and two side walls 58.

The main wall 56 includes cylindrical projections 60 for secure fastening of the support member 22 with the housing 40. The projections 60 are mounted in the main face 56 as is best shown in FIG. 7. The cylindrical projections 60 lie in the same vertical plane as is best illustrated in FIG. 6. It will be appreciated that within the spirit and scope of the invention, the cylindrical projections 60 may be offset.

The cylindrical projections 60 include opposed detents 62. The detents are normally spring biased to the extended position best shown in FIG. 6. When the support member 22 is connected to the housing 40 the detents 62 compress toward one another allowing the support member 22 to slide easily over the cylindrical projections 60. After the support member 22 is slid over the detents 62 they once again move to their normally extended position and lock the support member 22 in place in the housing 40.

The recess 54 is cut into the outside surface 52 such that the side walls 58 are angled and such that when the support member 22 is connected to the housing 40, the support member 22 creates an angle with the horizontal axis of the support surface to promote secure support for the bicycle in the upright position as is best illustrated in FIG. 1. When the support member 22 is connected to the housing, it is supported by the side walls 58 and this keeps the stand 10 steady while the bicycle is supported in the upright position.

The support member 22 has offset openings 64 for connection to the cylindrical projections 60. The offset of the openings 64 allow the angle of the support member 22 to be adjusted to the desired angle with the horizontal support surface. The support member 22 includes a foot 66 which is bent to promote secure contact of the support member 22 with the horizontal support surface.

The support member 22 is made of rust resistant, lightweight material which is strong enough to support the weight of the bicycle in the upright position. A solid piece of metal such as aluminum may be used as the support member 22. The piece of aluminum is drilled with openings 68 for an even lighter support member.

While the foregoing detailed description has described several embodiments of the a bicycle stand assembly and storage structure in accordance with this invention, it is to be understood that the above description is illustrative only and not limiting of the disclosed invention. Particularly, any number of fasteners may be used and there is a wide variety of materials from which the housing and mounting members may be made. It will be appreciated that the assembly need not be assembled within the scope and spirit of this invention. Thus the invention is to be limited only by the claims as set forth below.

What is claimed is:

1. A bicycle assembly for supporting a bicycle in the upright position while the bicycle is at rest, the assembly comprising:

elongated support means for supporting a bicycle in an upright position; and a housing adapted for removable connection to the frame of the bicycle, the housing including:

a first housing member and a second housing member, each member having an inside surface for mating contact with the bicycle frame;

means for connecting the first and second members with the frame between the members; and the first member including means for removably connecting the support means, the means for removably connecting the support means including the first housing member having a recessed outer surface with a plurality of cylindrical projections and the support means comprising a rod-like structure having openings at one end for compatible connection with the cylindrical projections.

2. A bicycle assembly as set forth in claim 1, wherein the support means includes storage means for storing the assembly on the bicycle.

3. A bicycle assembly as set forth in claim 2, wherein the storage means comprises:

a first mounting member having an inside surface for mating connection with the bicycle frame and a second mounting member defining means for connecting the first mounting member to the bicycle frame; and a clip member adapted for connection to the first mounting member, the clip member further adapted for retaining the elongated support means.

4. A bicycle assembly as set forth in claim 3, wherein the second mounting member comprises a pair of ties wrapped around the first mounting member and the frame.

5. A bicycle assembly as set forth in claim 1, wherein the housing is mounted on the lower portion of the bicycle frame.

6. A bicycle assembly as set forth in claim 1, wherein the cylindrical projections include detents at a distal end for locking the support means in place.

7. A bicycle assembly as set forth in claim 1, wherein the inside surface is angled to promote intimate contact with the frame.

8. A bicycle assembly as set forth in claim 7, wherein the inside surface forms a V shape and the V makes an angle of 120°.

9. A bicycle assembly as set forth in claim 1, wherein the openings are offset.

10. A bicycle assembly as set forth in claim 1, wherein the support means is made from lightweight, rust-resistant metal.

11. A bicycle assembly as set forth in claim 10, wherein the support means is solid and has a plurality of holes for further lightening of the support.

12. A bicycle assembly as set forth in claim 1, wherein the support means includes a foot to assist in supporting the bicycle.

13. A bicycle assembly as set forth in claim 1, wherein the projections include means for retaining the support means on the projections.

14. A bicycle assembly as set forth in claim 13, wherein the means for retaining the support means on the projections includes opposed detents on the projections.

* * * * *